United States Patent
Schell (10) Patent No.: US 8,913,992 B2
(45) Date of Patent: Dec. 16, 2014

(54) METHODS AND APPARATUS FOR ACCESS DATA RECOVERY FROM A MALFUNCTIONING DEVICE

(76) Inventor: Stephan V. Schell, Cupertino, CA (US)

( * ) Notice: Subject to any disclaimer, the term of this patent is extended or adjusted under 35 U.S.C. 154(b) by 427 days.

(21) Appl. No.: 13/287,874

(22) Filed: Nov. 2, 2011

(65) Prior Publication Data

US 2012/0115441 A1  May 10, 2012

Related U.S. Application Data

(60) Provisional application No. 61/409,891, filed on Nov. 3, 2010.

(51) Int. Cl.
*H04M 1/66* (2006.01)
*H04L 29/06* (2006.01)
*H04W 12/06* (2009.01)

(52) U.S. Cl.
CPC ............ *H04L 63/0853* (2013.01); *H04L 63/18* (2013.01); *H04W 12/06* (2013.01)
USPC ........... 455/411; 455/417; 455/410; 455/466; 455/558; 455/432.2; 455/12.1; 455/16; 455/556; 455/575.1

(58) Field of Classification Search
USPC .................. 455/556.1, 456.4, 418, 41.2, 411, 455/575.1, 517, 518, 456.3, 3, 6, 417, 7, 455/410, 466, 558, 435.2, 13.1, 16
See application file for complete search history.

(56) References Cited

U.S. PATENT DOCUMENTS

| 5,991,406 A * | 11/1999 | Lipner et al. ................. 380/286 |
| 2011/0010543 A1 * | 1/2011 | Schmidt et al. ............... 713/168 |
| 2012/0081207 A1 * | 4/2012 | Toprani et al. ................ 340/4.3 |

FOREIGN PATENT DOCUMENTS

| EP | 1870814 A1 | 12/2007 |
| TW | 200636447 | 10/2006 |
| WO | 2009141764 A2 | 11/2009 |
| WO | WO2010102259 | 9/2010 |

OTHER PUBLICATIONS

Taiwanese Patent Application No. 100139963—Office Action dated Mar. 24, 2014.

* cited by examiner

*Primary Examiner* — Joseph Arevalo
(74) *Attorney, Agent, or Firm* — Womble Carlyle Sandridge & Rice, LLP (57) ABSTRACT

Methods and apparatus for recovering access data from a malfunctioning device. In one embodiment, trained service personnel are provided a specialized apparatus for retrieving access data from a malfunctioning device. For example, in the instance the device comprises a cellular device having an unrecoverable hardware failure, trained service personnel can connect to the secure element and retrieve the one or more electronic Subscriber Identity Modules (eSIMs) stored thereon. The eSIMs are then "reclaimed" and reprogrammed/distributed to a new device. In one implementation, security and integrity measures are taken to protect and control distribution of sensitive access data.

20 Claims, 6 Drawing Sheets

METHODS AND APPARATUS FOR ACCESS DATA RECOVERY FROM A MALFUNCTIONING DEVICE

PRIORITY AND RELATED APPLICATIONS

This application claims priority to U.S. Provisional Patent Application Ser. No. 61/409,891 filed on Nov. 3, 2010 and entitled "METHODS AND APPARATUS FOR ACCESS DATA RECOVERY FROM A MALFUNCTIONING DEVICE", the foregoing being incorporated herein by reference in its entirety.

This application is related to co-owned, U.S. patent application Ser. No. 13/109,851 filed on May 17, 2011 and entitled "METHODS AND APPARATUS FOR ACCESS CONTROL CLIENT ASSISTED ROAMING", Ser. No. 13/079,614 filed on Apr. 4, 2011 and entitled "MANAGEMENT SYSTEMS FOR MULTIPLE ACCESS CONTROL ENTITIES", Ser. No. 13/111,801 filed on May 19, 2011 and entitled "METHODS AND APPARATUS FOR DELIVERING ELECTRONIC IDENTIFICATION COMPONENTS OVER A WIRELESS NETWORK", Ser. No. 13/080,521 filed on Apr. 5, 2011 and entitled "METHODS AND APPARATUS FOR STORAGE AND EXECUTION OF ACCESS CONTROL CLIENTS", and Ser. No. 13/078,811 filed on Apr. 1, 2011 and entitled "ACCESS DATA PROVISIONING APPARATUS AND METHODS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and, more particularly in one exemplary aspect to wireless systems that allow user equipment to authenticate to wireless networks (e.g., cellular networks, WLANs, WMANs, etc.) using access control clients and for the access data to be recovered if the device malfunctions.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of a typical wireless system (e.g., a cellular system such as the well known Universal Mobile Telecommunications System (UMTS)), access control is governed by an access control entity or client, referred to as a Universal Subscriber Identity Module (USIM) (or more generally referred to as a "SIM"), executing on a physical Universal Integrated Circuit Card (UICC). The USIM authenticates the subscriber to the UMTS cellular network. After successful authentication, the subscriber is allowed access to the cellular network.

When a SIM card is manufactured, the SIM card is programmed with carrier-specific authentication information that restricts the use of that SIM card to a particular carrier. If a user wishes to change services from the existing carrier to a new carrier, the user needs to replace their SIM card with a new SIM card programmed in a similar way, but for the different carrier.

One benefit of physical SIM cards is that they can be removed from one device and put into another device. For example, if a subscriber damages their existing phone (without damaging the SIM card), the subscriber can still salvage their SIM card for use with another phone. However, existing SIM solutions have other weaknesses and shortcomings. For example, subscribers need new SIM cards to change SIM operation (e.g., change carriers). Also, SIM card receptacles require significant internal device board space, and contribute to the size of the overall device form factor.

Thus, desirable solutions to the foregoing issues would have the advantages of SIM card devices (e.g., recovery of subscriber specific user information) without the drawbacks of the physical SIM card itself. For instance, improved solutions for managing and accessing wireless services which do not rely on a physical card for access control would ideally include mechanisms for retrieving access data in the instance the device malfunctions.

SUMMARY OF THE INVENTION

The present invention addresses the foregoing needs by providing, inter alia, apparatus and methods for providing subscriber access data provisioning and retrieval services to users.

In a first aspect of the invention, a wireless apparatus is disclosed. In one embodiment, the apparatus comprises: a communications interface; a power supply; a processor; a secure element adapted to store a plurality of user access data, where each user access data enables the apparatus access to a corresponding network via the one or more interfaces; and a second or "bypass" interface, wherein the bypass interface enables access to the secure element, without requiring the communications interface, the power supply, and the processor.

In a second aspect of the invention, a system for retrieving access data stored within an inoperable device is disclosed.

In a third aspect of the invention, a method for retrieving access data stored within a device is disclosed.

In a fourth aspect of the invention, an access data retrieval device is disclosed.

In a fifth aspect of the invention, a user equipment (UE) device capable of securely transferring access data is disclosed.

In a sixth aspect of the invention, a network architecture for providing access data to one or more target devices is disclosed.

In a seventh aspect of the invention, a network architecture for use in retrieving subscriber access data from a malfunctioning device is disclosed.

Other features and advantages of the present invention will immediately be recognized by persons of ordinary skill in the art with reference to the attached drawings and detailed description of exemplary embodiments as given below.

All Figures © Copyright 2010 Apple Inc. All rights reserved.

DETAILED DESCRIPTION OF THE INVENTION

Reference is now made to the drawings wherein like numerals refer to like parts throughout.

Overview

As described in greater detail hereinafter, exemplary embodiments of the present invention emulate access clients (e.g., SIM card) as a virtual or electronic entity that is executed within a secure element. These Electronic Subscriber Identity Modules (eSIMs) provide all the benefits of SIM operation, without the physical limitations of the SIM card. However, in order to provide recovery of SIM data from a damaged or other wise malfunctioning phone, the secure element is outfitted with a secondary or "bypass" interface for wireless or wired connectivity to recovery apparatus during malfunction or failure. The bypass interface enables an external recovery apparatus to retrieve appropriate eSIM data from the malfunctioning device, and thereafter void or delete the target device's eSIM data.

Various aspects of the present invention are broadly applicable to virtualized access control clients, and access data. Specifically, mechanisms for retrieving access data for managing and accessing wireless services which do not rely on a physical card for access control are disclosed. In one exemplary embodiment, the present invention provides an interface (which may optionally be inaccessible to typical users) that enables e.g., trained service personnel to retrieve eSIM data that is stranded on a malfunctioning device. In alternate embodiments, a standardized interface (e.g., such as the proprietary 30-pin dock connector developed and manufactured by the Assignee hereof) is capable of directly accessing the secure element for retrieving eSIM data.

In another aspect of the present invention, methods and apparatus for enabling secure access to the secure element are described. In one such embodiment, the present invention contemplates using one or more cryptographic keys to ensure integrity of eSIM data during transfer. In one such variant, the cryptographic keys comprise asymmetric public/private key pairs, which have been certified with a trusted entity. In other variants, the cryptographic keys comprise private keys that have limited distribution.

In various embodiments of the present invention, methods and apparatus for ensuring that eSIM data remains unique are disclosed. Specifically, in one such variant, when eSIM data is retrieved from a target device, the copy on the target device is voided or disabled. In other such variants, when eSIM data is retrieved from a target device, the copy on the target device is deleted or destroyed. Such measures ensure that only a single version of the eSIM data can be active at any one time. Moreover, various embodiments of the present invention are further adapted for use with network and client server copies of the eSIM data.

Detailed Description of Exemplary Embodiments

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the provisioning and use of multiple access control entities or clients.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of the prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services.

Generally, UICCs are programmed with a USIM prior to subscriber distribution; the pre-programming or "personalization" is specific to each network operator. For example, before deployment, the USIM is associated with an International Mobile Subscriber Identity (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Example Operation—

In the context of the exemplary embodiment of the present invention, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple USIM elements, referred hereafter as Electronic Subscriber Identity Modules (eSIM). Each eSIM contains the same logical entity as a typical USIM. The eUICC selects an eSIM based upon the eSIM's ICC-ID and receives the eSIM securely from an eSIM provisioning server or other storage entity. Once the eUICC selects the desired eSIM(s), the UE can initiate an authentication procedure to obtain wireless network services from the eSIM's corresponding network operator.

Unfortunately, in the event the device ceases to function properly (for example if the device is unable to power-on or boot-up), the eSIM data specific to that subscriber account is stranded on the device. Prior art SIM card solutions can salvage SIM card data from the malfunctioning device by ejecting the physical SIM card. However, because exemplary embodiments of the present invention have virtualized the SIM card functionality within an eSIM and eUICC, the eSIM data cannot be physically ejected, and/or the secure storage which holds the virtual SIM is in fact physically secure so as to prevent e.g., surreptitious access during non-failure (normal) operation even if one can gain access to it.

Figure 1:
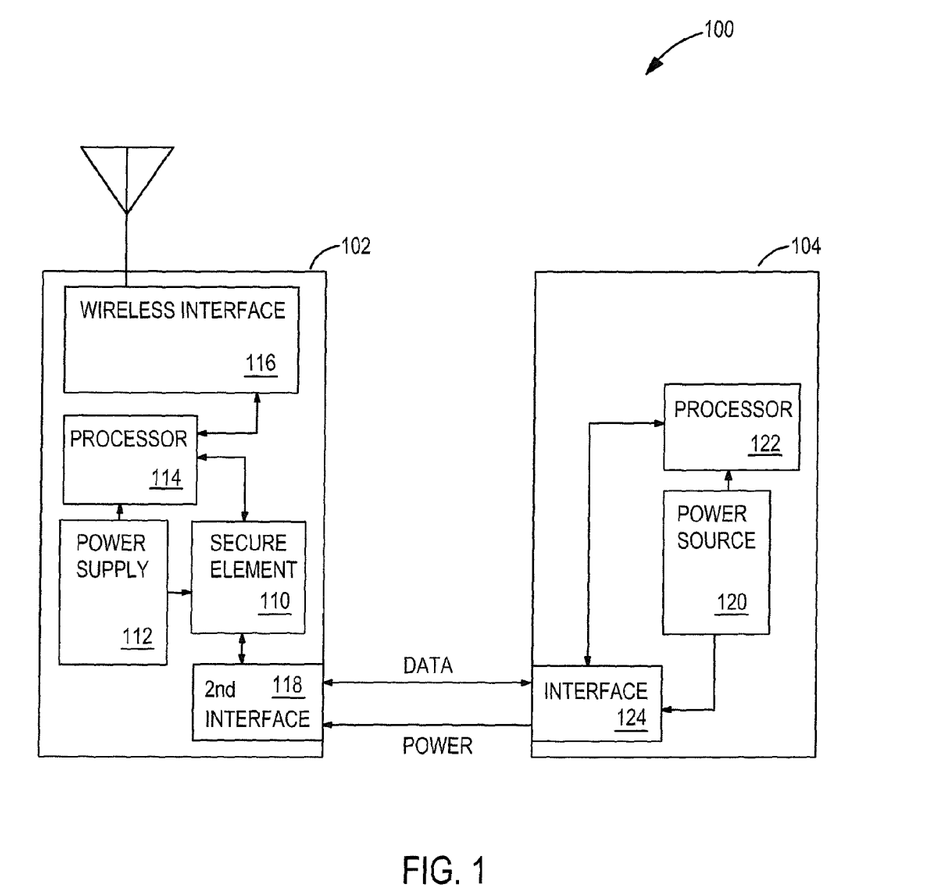
FIG. 1 illustrates one exemplary embodiment of a system for retrieving access data stored within an inoperable device, in accordance with the present invention.

Consider the exemplary system 100 as illustrated in FIG. 1. The system comprises a device 102 (such as e.g., an iPhone™ smartphone device developed and manufactured by the Assignee hereof) and a recovery apparatus 104 (such as a customer service computer, etc.) As shown, the device comprises a secure element 110, a power supply 112, a processor 114, and a wireless interface 116. The secure element also has a secondary interface 118 useful for recovery mode access; for example, in the exemplary embodiment, the secondary interface comprises inputs for power and data. In some synchronous embodiments, the secondary interface may include a generated clock (not shown).

The recovery apparatus 104 comprises a bypass-mode power source 120, processor 122, and corresponding interface 124. The recovery apparatus is adapted to connect to the secondary interface via the corresponding interface 124.

During normal operation, the secure element 110 executes the eUICC and eSIM logical entities which perform the necessary authentication process to obtain wireless network services from the eSIM's corresponding network operator. Specifically, the secure element receives power from the power supply 112, and is accessed by (or facilitates) the processor 114 to authenticate the subscriber to the wireless network via the wireless interface 116.

During a recoverable malfunction, one or more of the power supply 112, processor 114, and/or wireless interface 116 is rendered inoperable. In one exemplary scenario, after a subscriber has experienced a device malfunction, the "dead" device is taken to e.g., service personnel, trusted network representatives, etc. The secure element 110 of the device is connected to a recovery apparatus 104. The recovery apparatus provides power sufficient to power the secure element 110. Note that power need not necessarily be delivered via a wired interface; wireless (e.g., inductive or capacitive) power transfer may also be used, thereby obviating wired interfaces or connections.

The secure element then boots into recovery mode operation, and responsively executes a recovery procedure. The recovery procedure may include establishing a secure communication session between the device 102 and the recovery apparatus 104 if desired (e.g., to protect the sensitive eSIM data during or after transfer). Upon successful connection, the recovery apparatus extracts the eSIM information from the device. As further discussed herein after, the recovery apparatus may also erase data from the secure element, or otherwise disable the eSIMs of the secure element.

The foregoing example is merely illustrative, and other variations of the present invention are envisioned. For example, in an alternate embodiment, the subscriber is able (via secure software), to execute device recovery without external assistance (e.g., on a home or personal computer, or specialized recovery device that may be purchased by the user). Such embodiments may include e.g., repurposing an existing connector, or otherwise enabling existing connectivity to access the internal secure element 110. For example, in one such alternate embodiment, the subscriber can connect a personal computer executing recovery software to the secure element of his/her iPhone via the existing 30-pin proprietary iPod™ docking connector developed and manufactured by the Assignee hereof.

In yet other alternate embodiments, partially or completely wireless solutions are envisioned, such as e.g., wherein an inductive or capacitive electrical power interface is used to externally power the device. That same interface (or another wireless interface of the device) may also carry data to initiate and perform the eSIM recovery process. Alternatively, a wired power supply can be used with an indigenous wireless interface to recover the eSIM.

Yet other variations of the present invention are described in greater detail hereinafter.

Method—

Figure 2:
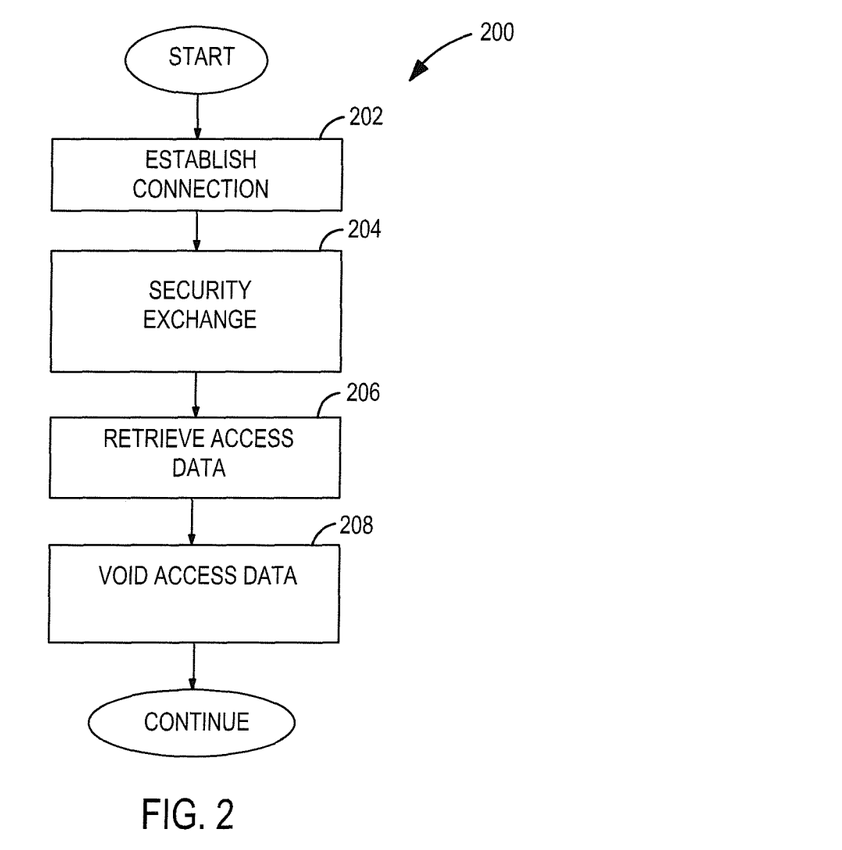
FIG. 2 is a logical flow diagram illustrating one embodiment of a method for retrieving access data stored within a device, according to the invention.

FIG. 2, illustrates one embodiment of a generalized method 200 for retrieving access data (or other data) from a secure element on a device. Various embodiments of the present invention can be used to access data (such as eSIM information) stored on a device which is malfunctioning, broken, or is otherwise unable to be accessed or used by the user. Still other embodiments may be used to retrieve access data while the device is inactive; e.g., during test modes, or diagnostic operation, etc.

In particular, the secure element of the device comprises a dedicated processor which can be independently powered from the rest of the device (such as by the connection to the access data retrieval apparatus). In some variants, the dedicated processor can bypass the primary processor of the malfunctioning device. The dedicated processor establishes a secure connection with the access data retrieval apparatus, thereby allowing retrieval of the access data without compromising the integrity of the access data.

As shown, per step 202, a connection is established between the secure element and the retrieval apparatus over an interface. In one embodiment the interface comprises at least a power, and data interface. Common examples of such data interfaces include, inter alia, Joint Test Action Group (JTAG), Universal Serial Bus (USB), IEEE-1394, Universal Asynchronous Receiver/Transmitter (UART), Inter-Integrated Circuit (I2C), etc. In one such variant, the interface is a synchronous interface which is externally clocked by the retrieval apparatus. In alternate variants, the interface is asynchronous (i.e., the secure element and retrieval apparatus do not share a common time base). In one exemplary embodiment, a JTAG or IEEE 1149.1 Standard Test Access Port and Boundary-Scan Architecture interface at the device may enable the interaction between the device and retrieval apparatus to enable the latter to retrieve the eSIM data. JTAG interfaces are commonly used as IC debug ports in digital electronics products such as cell phones or a wireless access points. However, in the present embodiment, the JTAG interface is further configured to receive and transmit serial data relating to a request for access data, and the access data itself.

In one such variant, the interface is inaccessible to the typical device user (such as where the device must be opened or modified to permit access data recovery). For example, device manufacturers may prefer that malfunctioning equipment is always serviced by trained service personnel, etc. In other such variants, establishing a connection to the secure element requires specialized software and/or hardware. Such specialized software or hardware distribution may be limited in distribution, sold as a separate product, etc. In alternate variants, the interface is readily accessible to the device user, and suitable for user-driven access data recovery. For example, the device may repurpose a connector typically used for normal operation (e.g., a dock connector, etc.)

In one exemplary embodiment, establishing a connection to the secure element via the interface automatically causes the secure element to execute in recovery mode. For example, in one such implementation, connecting to the interface with an appropriate power supply drives a detection circuit (e.g., a pull-up resistor, etc.) that enables recovery mode operation.

In alternate embodiments, the secure element can be switched in-to and out-of recovery mode. In recovery mode, the interface can be used to connect to the secure element. In modes other than recovery mode, the interface is either disabled, or configured differently. For example, a mechanical or software switch or other means can be used to enable or disable recovery mode operation.

Next at step 204, a security exchange occurs between the secure element and the retrieval apparatus over an interface. In one embodiment, the security exchange requires successful establishment of one or more cryptographic material. In one variant, the cryptographic material comprises a shared symmetric key. In other variants, the cryptographic material comprises one or more asymmetric key pairs of the type well known in the cryptographic arts.

As a brief aside, public/private key pairs are based on a secret private key, and a publishable public key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm or in fact asymmetric techniques.

Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

Referring back to step 204, in one exemplary embodiment, successful establishment of one or more cryptographic material elements comprises a challenge and response type encryption exchange, and transfer of cryptographic material suitable for generating one or more cryptographic keys.

For example, in one exemplary asymmetric key scheme, the secure element and the recovery apparatus exchange public keys. The secure element encrypts a digitally signed certificate from an external trusted authentication authority (e.g., a network carrier entity), using the public key received from the recovery apparatus, and transmits the result to the recovery apparatus. The recovery apparatus recovers the certificate with its private key. Successful completion of the foregoing exchange ensures that the connection is secure, and the secure element is a legitimate entity. Similarly, the recovery apparatus encrypts a digitally signed certificate from an external trusted authentication authority (e.g., a network carrier entity), using the public key received from the device, and transmits the result to the device. The device recovers the certificate with its private key, thereby verifying the identity and authenticity of the recovery apparatus. Once both entities have mutually authenticated one another, the resulting secure connection can be used to retrieve access data stored on the secure element.

Alternately, in a symmetric key scheme, the secure element and the recovery apparatus have an a priori agreed upon shared private key. For example, in one such scheme the recovery apparatus is a secure fixture of the network carrier, and maintains a connection to a database of private keys corresponding to secure elements. During recovery mode operation, the secure element identifies itself. The recovery apparatus retrieves the appropriate key. Thereafter, communications between the secure element and the recovery apparatus can be conducted using the shared key.

Yet other schemes for establishing cryptographic material are well known in the related arts, and may be readily implemented by those of ordinary skill, given the contents of the present disclosure.

Referring back to FIG. 2, at step 206, one or more access data is retrieved from the secure element of the device. In one embodiment, the device receives a request for one or more access data, and in response to the request, the device provides the appropriate data. Alternatively, the secure processor of the device may be configured to, upon successful completion of a secure connection, immediately transfer its access data without request, or upon occurrence of another event (e.g., expiration of a timer).

In one embodiment, the access data comprises one or more eSIM stored on the device, and the retrieval step (step 206) comprises a physical movement of the actual eSIM data from the device to the access data retrieval apparatus. Physical movement of the actual eSIM data comprises in some cases retrieving or reading the actual eSIM data from the secure element, and writing it to another device, which may or may not include copying it. Hence, the term movement as used in the present context is meant to include instances where the data is merely copied to another device, as well as instances where it is written to a target device and removed from the source (i.e., defective) host or user device.

In alternate embodiments, moving the eSIM data from the device to the access data retrieval apparatus comprises transfer of a token. For example, the access data (such as eSIM data) may already be physically stored at an entity other than the device. For example, eSIM data for a particular device may be parked at a network entity or stored within a client "wallet". Accordingly, the access data is not retrieved directly from the UE, but instead a signed message authorizing the release of the access data is received therefrom. The signed message can then be used to allow distribution of access data to a different device from the network entity, or wallet on which it is stored.

Specifically, signed messages are an authorization (e.g., the signed release) and an indicator specific to the entity on which the access data is stored. For example, access data associated to the malfunctioning device may be stored at e.g., a separate user device. The retrieval apparatus can forward the signed release to the entity on which the access data is stored. Thereafter, the entity adjusts its internal database to reflect that the access data is available for allocation to another device. The malfunctioning device is removed from the database, or alternately noted as a malfunctioning or deactivated device.

Lastly, at step 208, the device is optionally voided of the retrieved access data. In other words, one or more steps are taken to ensure that the device no longer retains any portion of the eSIM information. This may be accomplished in one embodiment by causing the device to be fully erased and restored. In other words, the dedicated processor runs at least one application for searching and removing from device storage (and other components) indications, components, artifacts, etc. of the access data. Alternatively, the eSIM data may be disabled or intentionally corrupted to frustrate future use, such as by permuting data bits according to a corruption or scrambling algorithm. Use of such an algorithm may, in some cases, allow the corrupted eSIM to be "unscrambled" at a future time in case use of the eSIM on that device is again desired (e.g., if the host is repaired so that it can be used again).

Once the access data is retrieved it may be subsequently transmitted from the retrieval apparatus. For example, the access data may be provided to a new/replacement device directly from the retrieval apparatus. Alternatively, the access data may be provided from the retrieval apparatus to a provisioning entity, such as the access data provisioning server. The provisioning entity is then responsible for the subsequent allocation or reuse of the access data to yet another device and/or linking the access data to another device. The other device may be associated with the same user as the malfunctioning device; alternately, the access data may be reallocated to a new user.

It is appreciated that capabilities for retrieval of access data (e.g., eSIM) has intrinsic value for device consumers, thus various other embodiments of the present invention may further include steps for e.g., enabling the retrieval of an eSIM from a malfunctioning device according to a subscriber class, recovery fees, etc. Business rules may also be implemented, such as for generating revenue for an operator of the access data retrieval apparatus. For example, the retrieval apparatus may be operated by e.g., a device manufacturer partner (such as the Assignee hereof). The device manufacturer may be partnered to one or more mobile network operators (MNOs), and may command a premium for access to the eSIM resident on or associated with a malfunctioning device. Pricing structures may be derived based on subscriber levels, levels of services provided, rapidity with which the eSIM can be recovered and transferred, etc.

It is further appreciated that literally any type or kind of information may be retrieved from a malfunctioning device, the access data (e.g., eSIM) discussed herein being but one exemplary type of information.

Exemplary Access Data Retrieval Apparatus—

Figure 3:
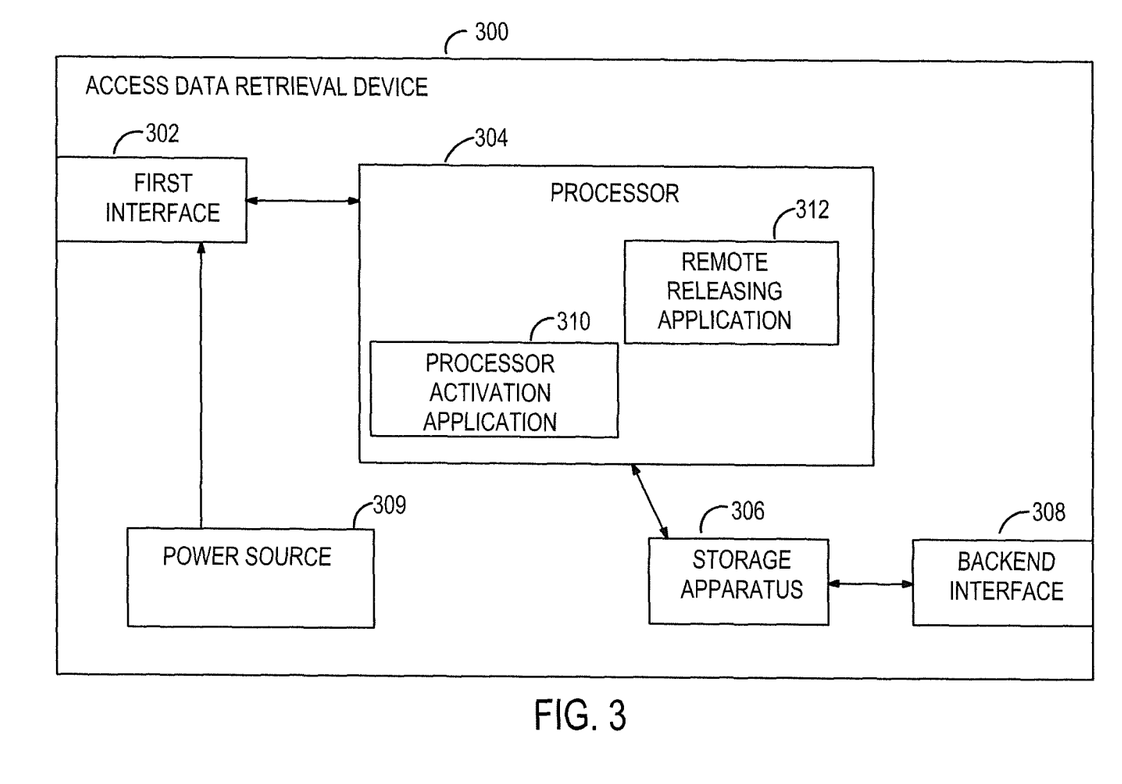
FIG. 3 is a block diagram illustrating one embodiment of an access data retrieval device according to the invention.

FIG. 3 illustrates one exemplary embodiment of an access data retrieval apparatus 300 useful with the present invention. As discussed above, the retrieval apparatus 300 is adapted to physically connect to a device in order to retrieve and/or release access data.

As shown, the retrieval apparatus 300 generally includes a first interface 302 for communication to a device, a processor 304, a storage apparatus 306, and a backend interface 308 for communication with additional devices or other entities. The first interface 302 may, in one embodiment, comprise an interface configured to communicate with the JTAG signals (e.g., TDO, TDI, etc.) of the device's dedicated processor (discussed below). In other embodiments, the physical connector utilized to transmit and receive data signals to the device is a Universal Serial Bus (USB) port, 30-pin proprietary iPod docking connector, Universal Asynchronous Receiver/Transmitter (UART), Inter-Integrated Circuit (I2C), etc.

In the illustrated embodiment, the processor 304 running on the access data retrieval apparatus 300 includes at least a processor activation application 310. The processor activation application 310 is utilized to trigger the activation of the access data retrieval application of the target device. In other words, once the target device and access data retrieval apparatus 300 are connected, the processor activation application 310 functions to: (i) cause delivery of electrical power to the target device, (ii) participate in an authentication exchange, such as via cryptographic key exchange, (iii) cause a dedicated processor on the target device to begin an access data retrieval process, and (iv) receive access data and/or a signed certificate releasing the access data from the target device.

As shown, in some embodiments, the processor 304 may additionally comprise a remote releasing application 312. The remote releasing application 312 is utilized to communicate with and cause release of access data stored on an entity other than the target device to which the data is associated. For example, in the instance eSIM data is stored at a so-called "client wallet" or stored at a network eSIM provisioning server, the remote releasing application: (i) establishes communication with the remote entity, such as via a network connection, direct connection, or other wired or wireless communication, (ii) participates in an authentication exchange with the remote entity, such as via a cryptographic key exchange, (iii) provides a release code received from the target device (such as a signed certificate) to release one or more access data, and (iv) optionally receives the access data from the remote entity.

In the illustrated embodiment, the processor 304 running on the access data retrieval apparatus 300 includes both of a processor activation application 310 and a releasing application 312. However, other incarnations may embody various subsets of the foregoing functionality. Moreover, although these are each illustrated as single applications running on the retrieval apparatus 300, it is appreciated that the functionalities thereof may exist as distributed applications running on a plurality of entities in data communication with one another, or a smaller number of consolidated or multifunction application(s).

Still further, either the processor activation application 310 and/or the remote releasing application 312 may be configured to transmit received access information to other entities in the network via one or more backend interfaces 308 of the retrieval apparatus 300.

The storage device 306 of the retrieval apparatus 300 may be configured to store the applications running on the processor (e.g., processor activation application 310 and/or remote releasing application 312). The storage device 306 may further provide temporary storage for access data retrieved from a malfunctioning device. The storage device 306 may be for example a random access memory (RAM) or read-only memory (ROM), a hard disk drive, an optical drive (e.g., CD-ROM or DVD), NAND/NOR flash memory, or some combination thereof.

In one embodiment, the retrieval apparatus 300 generally includes a power source 309 and configured to power a secure element and/or dedicated processor of a connected target device. Thus, in the instance the target device cannot be powered-on or booted-up, access data can still be retrieved from the secure element.

Exemplary User Equipment (UE)—

Figure 4:
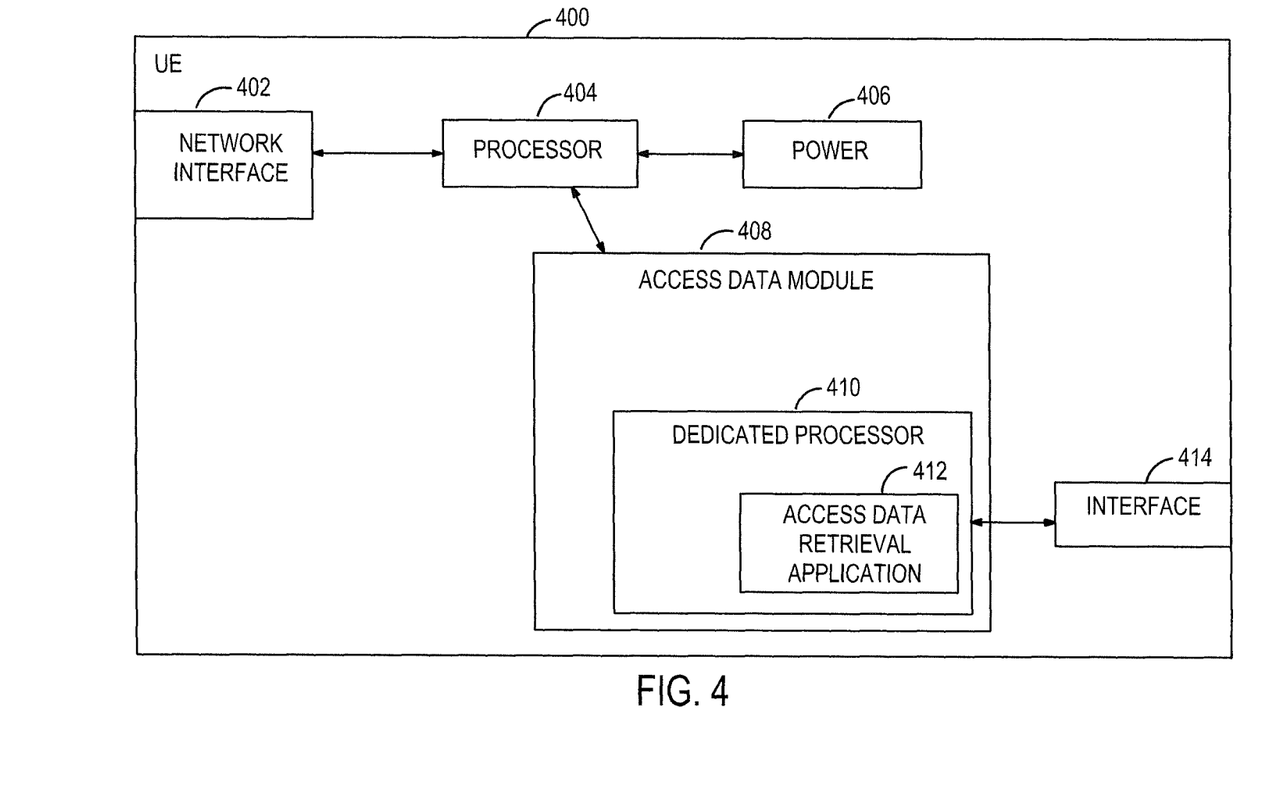
FIG. 4 is a block diagram illustrating one embodiment of a user equipment (UE) device capable of securely transferring access data, according to the invention.

FIG. 4 is a block diagram illustrating an exemplary user device (e.g., user equipment (UE)) 400 configured for operation with a retrieval apparatus 300 e.g., in the instance the UE 400 is malfunctioning. As discussed above, the UE 400 comprises e.g., mobile smartphone or the like, which has stored one or more access data. The access data may additionally be stored on the remotely (e.g., stored at a network server, or client wallet).

As illustrated, the exemplary UE 400 of FIG. 4 includes a network interface 402 for communication with a communication network (and entities thereof). The communication network may comprise, for example, a network for providing mobile telephone communication services (e.g., cellular network), a WLAN network, a WMAN network (e.g., IEEE Std. 802.16 WiMAX), etc. The UE 400 may be further configured to communicate via the network interface 402 to Internet-based entities, such as a client server, etc.

The UE 400 generally comprises a primary processor 404 for providing general software execution including, for example telephony functions. The primary processor is powered by a power supply 406 and utilizes access data stored on a secure access data module 408 to authenticate itself to a network. In one such implementation, the secure access data module 408 stores eSIM data suitable for authenticating the UE to a cellular network.

In one exemplary embodiment, the secure access data module 408 includes a separate dedicated digital processor 410. The dedicated processor 410 is configured to run at least an access data retrieval application 412 thereon which bypasses the first processor 404. An interface 414 for communication to the access data retrieval apparatus 300 is also illustrated. In one embodiment, the interface 414 comprises a 30-pin proprietary iPod docking connector developed and manufactured by the Assignee hereof. In other embodiments, the interface 414 is configured to communicate JTAG signals such as e.g., TDI, TDO, etc. signals to and from the retrieval apparatus 300. Yet other interfaces may be substituted by one of ordinary skill in the related arts, given the contents of the present disclosure.

Still further, additional data modules (not shown) may be in communication with the dedicated processor, thereby enabling the retrieval of data therefrom as well.

In one exemplary embodiment, the dedicated processor 410 may be powered by the access data retrieval device 300. Thus, in the instance the device cannot be powered-on or booted-up, separate power is provided to the dedicated processor 410 to enable access data retrieval from the malfunctioning device.

The access data retrieval application 412 running on the dedicated processor 410 is configured to: (i) utilize power provided by a connection of the UE 400 to the retrieval apparatus 300, (ii) participate in an authentication exchange, such as via cryptographic key exchange, (iii) identify all instances, references, components, etc. of access data at the secure access data module 408, primary processor 404, etc., (iv) provide access data to a retrieval apparatus 300 and/or provide a signed certificate releasing access data (such as additional access data associated to the UE 400 which is stored elsewhere), and (v) erase all of the instances, references, components, etc. of the access data at the UE 400.

The UE 400 may further comprise a storage entity (not shown), such as a random access memory (RAM), a hard disk drive, an optical drive (e.g., CD-ROM or DVD), NAND/NOR flash memory, or some combination thereof for storing one or more access control clients and/or the access data retrieval application 412 which is run on the dedicated processor 410.

Exemplary Network Architecture—

Figure 5:
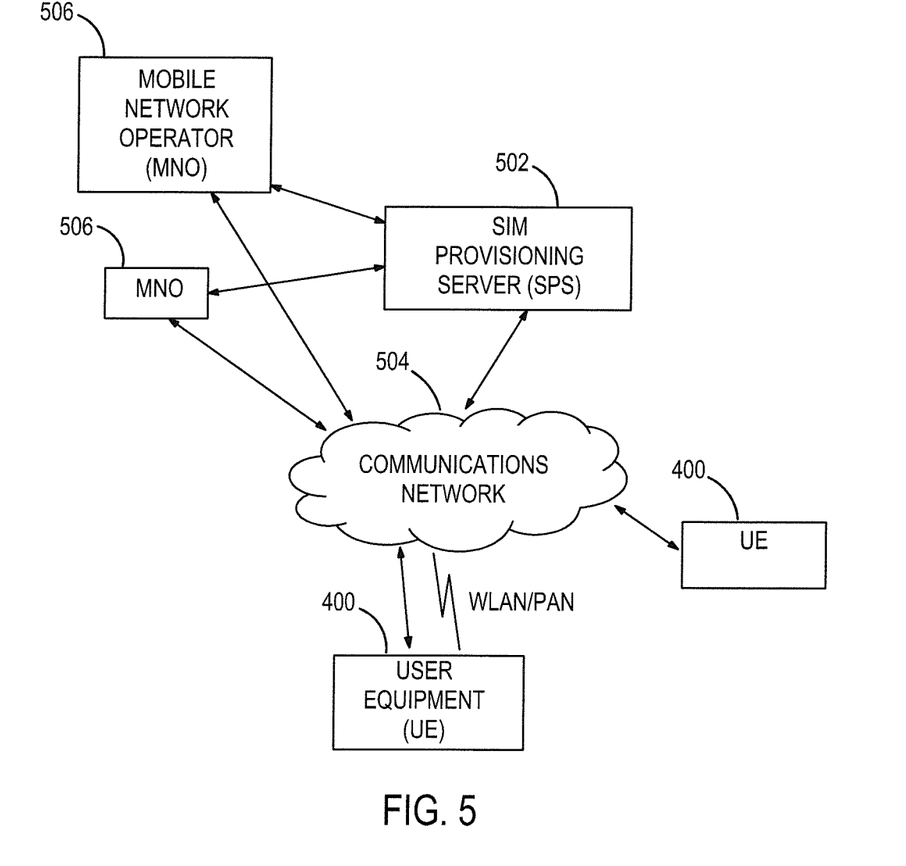
FIG. 5 illustrates one exemplary network architecture for providing access data to one or more target devices is illustrated.

Referring now to FIG. 5, one embodiment of an exemplary network architecture for providing access data to one or more user devices (e.g., UE) 400 is illustrated. It is appreciated, however, that various other network configurations and methods may be utilized for providing access data, the following being merely illustrative of a broader concept for the provision of access data to user equipment 400.

As shown, the network generally includes a SIM Provisioning Server (SPS) 502 configured to communicate with a plurality of user equipment (UE) 400 over a communications network 504. The SPS is further in communication with a plurality of mobile network operators (MNOs) 506.

Each MNO 506 comprises a wireless or mobile carrier and service provider. Exemplary MNOs 506 typically provide telephony, short message service (SMS) text, and data services to a group of subscribers via a communications network 504. Examples of MNOs 506 include e.g., AT&T™, Verizon™, Sprint™, etc.

The communications network 504 may be any network which enables the provision of the above-described services. For example, the communications network 504 may comprise Global System for Mobile Communications (GSM), General Packet Radio Service (GPRS), Enhanced Data rates for GSM Evolution (EDGE), Universal Mobile Telecommunications System (UMTS), or other network (e.g., CDMA2000, mobile WiMAX networks, WLAN networks, etc.).

The SPS 502 may be managed by a service intermediary (not shown) or an MNO 506. In one implementation, the service intermediary managing the SPS 502 is a device manufacturer (such as e.g., the Assignee hereof) partnered to one or more MNO's 506, although other arrangements may be used with equal success. In another implementation, the service intermediary managing the SPS 502 is a trusted service manager (TSM). Common examples of TSMs include SIM re-salers, etc. Since TSMs typically have pre-established trust relationships with one or more MNOs 506, by placing the SPS 502 and its associated functionality thereat, it is assured that service may be provided to all UEs 400 via the MNO associated with the TSM (not shown). In yet another implementation, access to all possible MNOs may be provided via the combination of the standalone SPS (and/or one managed by a service intermediary such as e.g., the Assignee hereof) and other TSM-managed SPS.

The SPS 502 stores a plurality of available access data (e.g., eSIMs) which are provided to and utilized by UE 400 in the network 504. The SPS may receive a "pool" of eSIMs from a third party access data generation entity (not shown), or alternatively, may generate the eSIMs itself. Each eSIM is pre-programmed or "personalized" based on the applicable network operator via the SPS 502. In one variant, the eSIMs stored at the SPS are also linked to a particular subscriber in the network such as by associating the eSIM to a device identifier.

It is further appreciated that the UE 400 may access the SPS 502 for authentication of the UE 400 to the MNO 506 (to ensure it is authorized to receive requested access data) and for the provision of access data to the UE 400 from the SPS 502 via the Internet.

The aforementioned transfer of the access data to a UE 400 may further include the transfer of dynamic data. Dynamic data relates to personalized data which is changed and/or created on the eSIM after initial personalization (discussed above). In other words, the eSIM is personalized to a specific network, subscriber and/or device either at the SPS 502 or another entity in communication therewith. The personalized eSIM is then provided along with the dynamic data to the device. As is true for the eSIM data, the dynamic data must remain secure during exportation to a UE 400 and while it is maintained thereon or transferred therefrom (where applicable). The dynamic data and/or the eSIM itself can be physically secured if desired; e.g., via public/private key or AES/DES encryption, use of a cryptographic residue or hash for integrity protection, etc.

One common example of dynamic data is eUICC/eSIM state after over-the-air-service provisioning (OTASP). For example, a MNO 506 performs OTASP to add new types of services to a subscriber's device by using the communication network 504 instead of requiring the subscriber to physically bring the device in for reprogramming. After performing OTASP, the MNO 506 tracks the eUICC state for the UE 400 (e.g., such as by ICC-ID). The tracked eUICC state migrates as part of the dynamic data. Another common example of dynamic data is user created data (e.g., phonebook information, etc.). This dynamic data may also be retrieved according to the methods discussed herein.

Figure 6:
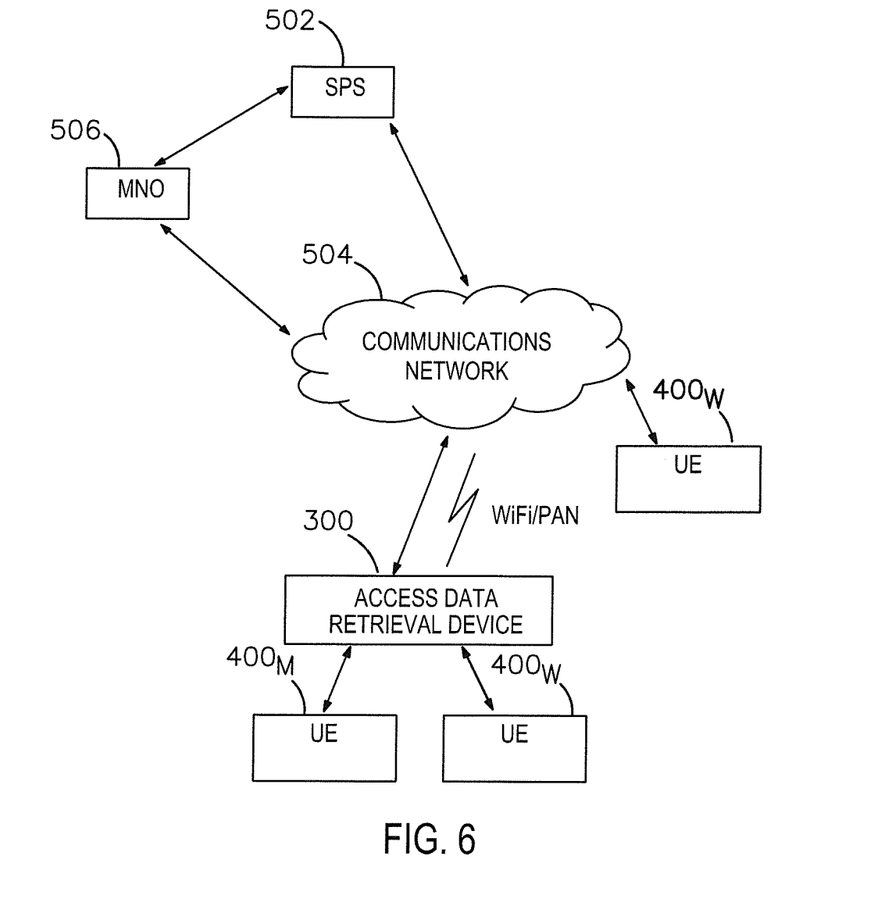
FIG. 6 illustrates one exemplary embodiment of a network architecture for use in retrieving subscriber access data from a malfunctioning device, according to the invention.

FIG. 6 illustrates an exemplary embodiment of a network architecture for use in retrieving subscriber access data from a malfunctioning device. As shown, the architecture generally comprises an access data retrieval apparatus 300 in communication with a malfunctioning UE 400$_M$. The retrieval apparatus 300 is further in communication with a server for providing access data to various devices, such as an SPS 502. The SPS 502 interfaces between the user devices and various MNO 506 in order to authenticate devices when providing or releasing access data.

As discussed above, the retrieval apparatus 300 is in communication with a malfunctioning UE 400$_M$. The retrieval apparatus 300 receives the access data or a signed certificate releasing the access data from the malfunctioning device 400$_M$. In the event the access data retrieval apparatus 300 physically retrieves the eSIM (or other access data) from the malfunctioning UE 400$_M$, the eSIM may be subsequently provided from the retrieval apparatus 300 to a second, working UE 400$_W$ upon appropriate authentication via the communications network 504. Alternatively, the retrieval apparatus 300 may provide the access data back to the provisioning entity (such as SPS 502).

In the event the retrieval apparatus 300 merely receives a release of the access data (as opposed to the data itself) such as in the form of a signed certificate from the malfunctioning UE 400$_M$ in the event the data is not stored thereat, the retrieval apparatus 300 may first be required to retrieve the actual eSIM data from the SPS 502 or other entity storing the data (such as e.g., a "client wallet"). In other words, if the UE 400$_M$ merely provides a signed certificate releasing certain eSIM data, the retrieval apparatus 300 provides the certificate to the SPS 502 via the communications network 504 (or other entity). The retrieval apparatus 300 may receive the released eSIM, or it may remain at the storing entity for subsequent provision to a working UE 400$_W$. The subsequent provision may be to a UE 400$_W$ which is associated with the same subscriber as the malfunctioning UE 400$_M$ or may be associated to a different subscriber. For example, the released (and unlinked) access data may be provided back to a pool of available access data for provision to any other user device.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A wireless apparatus, comprising:
   a communications interface;
   a power supply;
   a processor;
   an electronic Universal Integrated Circuit Card (eUICC) adapted to store a plurality of electronic Subscriber Identity Modules (eSIMs) wherein each eSIM of the plurality of eSIMs enables the wireless apparatus to access a particular cellular network using the communications interface; and
   a bypass interface, wherein the bypass interface;
      comprises a power input, a data input, a data output, and a clock input, and
      provides access to the plurality of eSIMs without requiring the communications interface, the power supply, and the processor to be operable.

2. The wireless apparatus of claim 1, wherein the wireless apparatus comprises a cellular phone.

3. The wireless apparatus of claim 1, wherein the bypass interface provides access to the plurality of eSIMs by:
   retrieving, from the eUICC, at least one eSIM of the plurality of eSIMs access, and
   removing, from the eUICC, the at least one eSIM.

4. The wireless apparatus of claim 1, wherein the bypass interface provides access to the plurality of eSIMs during a recoverable malfunction operation that involves one or more of the power supply, the processor, and the communications interface being inoperable.

5. The wireless apparatus of claim 4, wherein, when the power supply, the processor, and the communications interface are operable, the wireless apparatus authenticates to a cellular network using at least one eSIM of the plurality of eSIMs.

6. The wireless apparatus of claim 5, wherein the wireless apparatus is further configured to communicate with the cellular network upon a successful authentication.

7. The wireless apparatus of claim 1, wherein the bypass interface comprises an external interface that is accessible to a user without assistance from a third party.

8. The wireless apparatus of claim 7, wherein the external interface comprises a connector whose primary purpose is not a recovery of the plurality of eSIMs.

9. The wireless apparatus of claim 8, wherein the connector comprises a 30-pin connector.

10. The wireless apparatus of claim 7, wherein the bypass interface comprises an internal interface that is inaccessible to the user without assistance from the third party.

11. A method for recovering at least one electronic Subscriber Identity Module (eSIM) from a wireless device that is inoperable, the method comprising:
   at a retrieval device:
      establishing, using a bypass interface included in the wireless device, a secure connection to an electronic Universal Integrated Circuit Card (eUICC) included in the wireless device, wherein the eUICC stores the at least one eSIM, the bypass interface comprises a power input, a data input, a data output, and a clock input, and the bypass interface operates when the wireless device is inoperable;
      exchanging cryptographic material with the eUICC;
      retrieving the at least one eSIM from the eUICC, wherein the at least one eSIM is encrypted based at least in part on the cryptographic material; and
      voiding the at least one eSIM within the eUICC.

12. The method of claim 11, wherein the wireless device is inoperable when one or more of a power supply, a processor, and a communications interface included in the wireless device is inoperable.

13. The method of claim 11, wherein, when the wireless device is operable, the wireless device authenticates to a cellular network using the at least one eSIM.

14. The method of claim 11, wherein the bypass interface comprises a connector whose primary purpose is not a recovery of the at least one eSIM.

15. The method of claim 11, wherein the bypass interface comprises an internal interface that is inaccessible to an end user of the wireless device without assistance from a third.

16. A method for providing at least one electronic Subscriber Identity Module (eSIM) to a retrieval device, the method comprising:
at an inoperable wireless device including a bypass interface that comprises a power input, a data input, a data output, and a clock input:
responsive to a connection to the retrieval device:
entering into a recovery mode, and
exchanging, with the retrieval device, cryptographic material to secure the connection to the retrieval device;
responsive to a request for the at least one eSIM, providing the at least one eSIM to the retrieval device, wherein the at least one eSIM is stored in an electronic Universal Integrated Circuit Card (eUICC) included in the wireless device; and
subsequent to providing the at least one eSIM, voiding the at least one eSIM within the eUICC.

17. The method of claim 16, wherein the wireless device is inoperable when one or more of a power supply, a processor, and a communications interface included in the wireless device is inoperable.

18. The method of claim 16, wherein the bypass interface comprises a connector whose primary purpose is not the recovery of the at least one eSIM.

19. The method of claim 18, wherein:
the wireless device comprises a cellular phone; and
the eUICC comprises an electronic Universal Integrated Circuit Card (eUICC), and the at least one eSIM comprises an electronic Subscriber Identity Module (eSIM).

20. The method of claim 16, wherein the retrieval device is a personal computer.

* * * * *

UNITED STATES PATENT AND TRADEMARK OFFICE
CERTIFICATE OF CORRECTION

PATENT NO. : 8,913,992 B2  
APPLICATION NO. : 13/287874  
DATED : December 16, 2014  
INVENTOR(S) : Stephan V. Schell Page 1 of 1

It is certified that error appears in the above-identified patent and that said Letters Patent is hereby corrected as shown below:

In the Claims:

Column 13, line 67 (Claim 1, line 7): "(eSIMs) wherein" should read --(eSIMs), wherein--.

Column 14, line 4 (Claim 1, line 11): "bypass interface;" should read --bypass interface:--.

Column 14, line 15 (Claim 3, line 4): "eSIMs access, and" should read --eSIMs, and--.

Column 15, line 3 (Claim 15, line 3): "third." should read --third party.--.

Column 16, lines 12-14 (Claim 19, lines 2-4): "cellular phone; and the eUICC comprises an electronic Universal Integrated Circuit Card (eUICC), and the at least one eSIM" should read --cellular phone; and the at least one eSIM--.

Signed and Sealed this  
Twenty-sixth Day of May, 2015

Michelle K. Lee  
*Director of the United States Patent and Trademark Office*